United States Patent [19]

Price

[11] 4,363,162

[45] Dec. 14, 1982

[54] INFRARED HEAT TREATMENT OF PLASTIC FILM CAPACITORS

[76] Inventor: Rick A. Price, R.R.#2, Box 35-H-13, Ogallala, Nebr. 69153

[21] Appl. No.: 203,523

[22] Filed: Nov. 3, 1980

[51] Int. Cl.³ .............................................. H01G 7/00
[52] U.S. Cl. .................................... 29/25.42; 264/25; 250/492.1; 219/354
[58] Field of Search .................. 29/25.42; 264/25, 1.4, 264/272, 18, DIG. 7; 250/492.1, 341; 219/354; 361/323; 156/84, 85

[56] References Cited

U.S. PATENT DOCUMENTS

| | | | |
|---|---|---|---|
| 3,723,708 | 3/1973 | Tulkoff | 219/349 |
| 3,955,127 | 5/1976 | Hunt | 29/25.42 |
| 4,037,298 | 7/1977 | Flanagan et al. | 29/25.42 |
| 4,092,382 | 5/1978 | Heckman et al. | 264/25 |
| 4,260,567 | 4/1981 | Poppe et al. | 264/25 |

Primary Examiner—Carl E. Hall
Assistant Examiner—P. W. Echols

[57] ABSTRACT

An improved method for producing spirally wound film-foil or metallized film capacitors. The capacitors are formed by spirally winding alternating layers of dielectric film and metal foil (or two layers of metallized film) around a mandrel to form a cylinder. The dielectric film is oriented, i.e., heated and stretched along one or more axes, prior to winding. The wound cylinder is subjected to infrared radiant energy, which causes the dielectric film to shrink back toward its original unoriented state, thereby forcing air out between the layers of the winding and resulting in a more rigid cylinder. The application of radiant energy enables the cylinder to be heated from the inner turns to the outer turns. This manner of heating enables significant improvements in capacitor properties to be obtained and greatly reduces the time required for the heat shrink operation.

12 Claims, 4 Drawing Figures

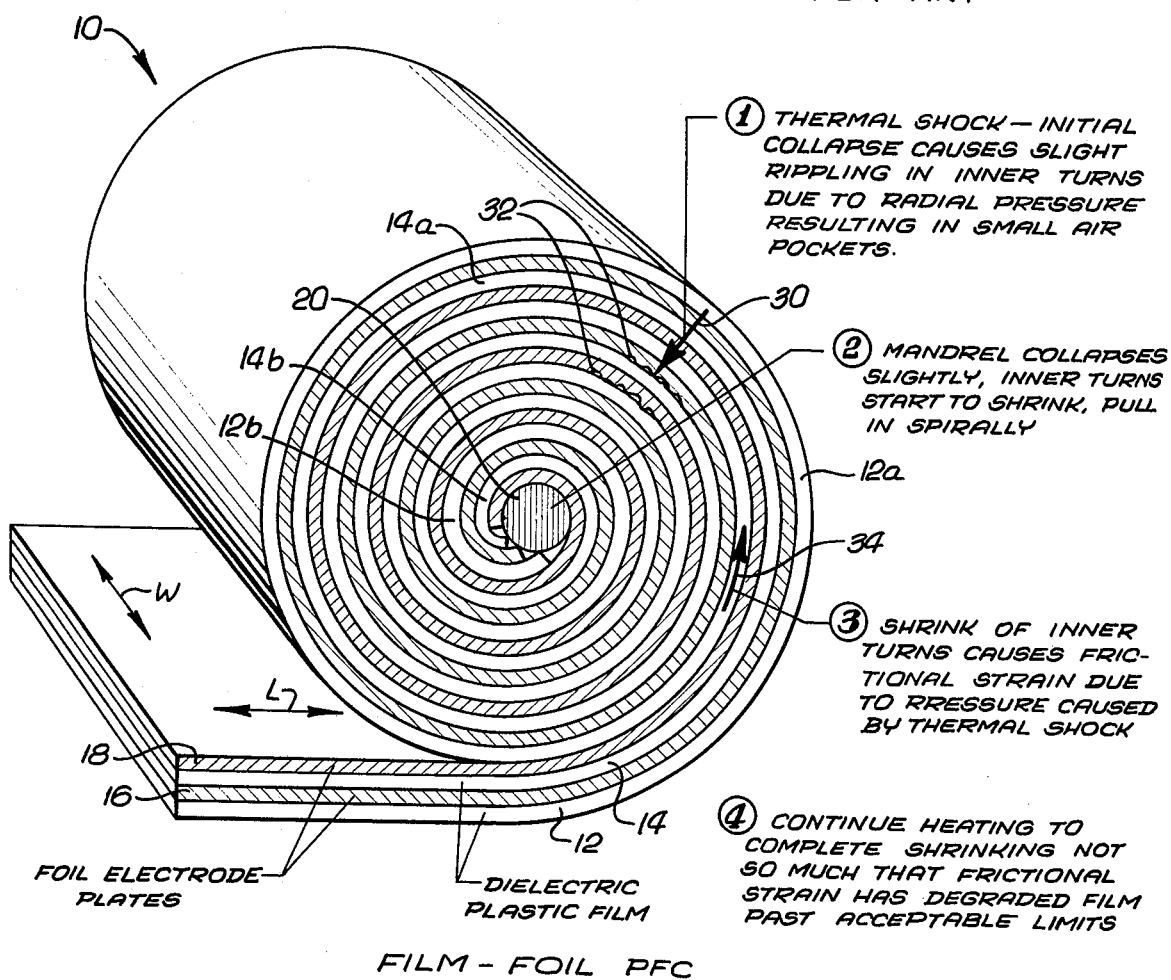
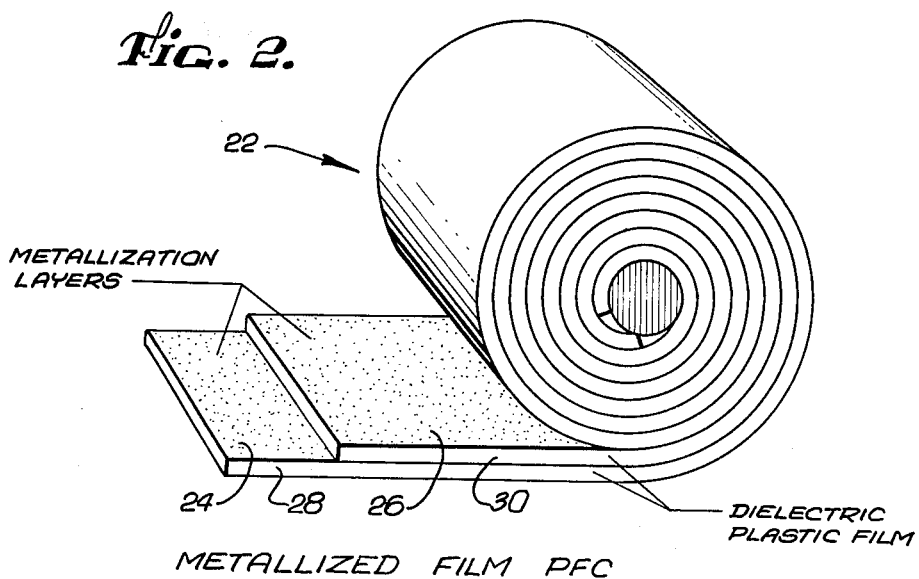

INFRARED HEAT TREATMENT OF PLASTIC FILM CAPACITORS

BACKGROUND OF THE INVENTION

1. Field of the Invention

This invention relates to a method of manufacture of plastic film capacitors. More particularly, this invention relates to a process for heat treating plastic film capacitors of either the film-foil or metallized film type.

A plastic film capacitor ("PFC") is one in which plastic film is utilized as the dielectric of the capacitor. A simple plate PFC is comprised of a dielectric plastic film sandwiched between a pair of metal foil electrode plates. One common type of plastic film capacitor comprises a plate capacitor which is rolled up upon itself so as to form a cylinder. A second layer of dielectric material is added to prevent the two electrode plates from making physical contact and shorting out, and to effectively double the capacitance value of the capacitor. The ends of the rolled capacitor are coated with an appropriate conductive material to allow for the attaching of leads. A partially wound cylinder of this type is shown in FIG. 1.

An alternative PFC construction differs from the film-foil type in that each foil electrode plate is replaced with a metallization layer which is vapor deposited on the dielectric film, as shown in FIG. 2. Foil electrodes typically have a thickness on the order of 0.00015 inches to 0.00075 inches, while the thickness of a metallization layer ranges between 0.000001 inches and 0.000002 inches. By effectively eliminating the two thick layers of foil from the capacitor, a considerable size reduction can be realized. In addition, metallized film capacitors are more reliable than film-foil capacitors due to more consistent electrical properties.

The dielectric material of a film capacitor consists of a solid, non-conducting thermoplastic film. Many different types of dielectric film can be utilized; however, the primary ones in use at present include polyester, polypropylene, polycarbonate, polystyrene and polysulfone. The dielectric insulating material in a film capacitor functions to accurately maintain the two electrode plates at a minute separation distance. In addition, the dielectric strength (i.e., the capacity for handling voltage without electrically breaking down) is higher with a dielectric film capacitor than would be the case with a capacitor using air as the electrode separation medium. Therefore, a larger voltage gradient (voltage rating) can be applied to the capacitor. Also, a dielectric film capacitor has the ability to hold a greater charge than does an air or a vacuum capacitor.

During the film manufacturing process, longitudinal and/or lateral stress forces are applied to the film sheet so as to cause it to axially stretch. The stretching, which is also referred to as orientation, is typically done with the sheet heated and the deformation is locked into the film by rapidly cooling the material to a temperature below which there is insufficient energy available to allow the plastic to be mobile enough to revert to its original unstressed dimensions. After the orientation process, the film is metallized to form the electrode plates (if metallized rather than film-foil type capacitors are to be produced). In order to form a cylindrical capacitor, the metallized film layers (or film and foil combination) are spirally wound tightly around a mandrel to form a plurality of turns.

Once a capacitor has been wound with the oriented plastic film, it is subjected to a heat treatment at a temperature at which the film again becomes mobile and attempts to revert to the dimensions of its original unoriented state. This temperature is different for various films, and typically ranges between 60 degrees C. and 180 degrees C. For a biaxially oriented film the heat treatment causes the film layer to reduce in width and length dimensions and increase in thickness. This heat treating process is commonly referred to as heat shrinking or heat stabilization. The dimensional changes in the film cause the layers of the capacitor to physically bond together more intimately and increase the physical stability of the capacitor. The heat treatment forces any minute amounts of entrapped air out from between the various layers in the capacitor and causes the dielectric film to spirally pull down upon itself, thereby causing the winding to become more rigid. Had the film not been originally stretched and subsequently heat treated, the capacitor winding would be soft and full of air, thereby making it prone to various parameter changes as a result of slight environmental variations such as barometric pressure, humidity and temperature. By employing the heat treatment process, a capacitor having improved electrical characteristics and stability is obtained.

2. Description of the Prior Art

Heretofore, the heat shrinking process has been accomplished by placing the wound capacitors in a convection oven. Heating of the turns of the wound cylinders with this method is not accomplished uniformly, however, thereby resulting in several problems. When initially placed in a hot oven, the outer turns of the wound cylinder will reach shrink temperature before the inner turns since the dielectric film, like any plastic, has extremely poor thermal conduction characteristics. The outer turns will therefore begin to shrink before the remaining turns of the cylinder. The shrinking causes the thickness of the outer turns to increase. Since the inner turns have not yet reached shrink temperature (and therefore have not yet begun to shrink), the dimensional changes of the outer turns causes a great deal of radial pressure to be built up in the winding. This initial collapse of the outer turns is commonly referred to as thermal shock (FIG. 1, reference numeral 1). The radial pressure created by the thermal shock causes a minute amount of rippling in the inner turns of the dielectric film, causing air to be trapped in the cylinder rather than pushed out.

After the initial thermal shock, the inner turns begin to heat up. When the interior turns reach full heat shrink temperature they finally begin to shrink down, causing the mandrel to collapse slightly (FIG. 1, reference numeral 2). The shrinking of the inner turns causes the dielectric to be pulled toward the mandrel in a spiral fashion. Because of the radial pressure created by the thermal shock, the spiral pulling causes frictional strain on the film (FIG. 1, reference numeral 3). The longer the cylinder is heat shrunk, the greater is the reduction of the original oriented stress on the dielectric film. Reduction of the oriented stress tends to relieve the radial pressure caused by the thermal shock.

Although it is desirable to completely shrink the film and relieve all of the radial pressure built up due to the thermal shock, it is not possible to do so since the spiral frictional strain will cause degradation of the film past acceptable limits before full pressure relief can be accomplished (FIG. 1, reference numeral 3). This inability to fully relieve the radial pressure constitutes a significant disadvantage in the prior art method of manufacturing PFC's.

In addition to the problem of not being able to fully relieve the radial pressure caused by the thermal shock on the wound cylinder, heat shrink time for a convection oven shrunk winding is generally measured in terms of hours, as opposed to a period of minutes which are required to fully shrink a free sheet of film. If the turns of the winding heated up uniformly the heat shrinking procedure could be completed very quickly. Due to the thermal shock, however, the heat shrink time must be increased in order to relieve the radial pressure. This is required due to the fact that any residual radial pressure has an adverse effect upon the properties of the capacitor, despite the fact that the winding is mechanically rigid. These properties include drift (variation of capacitance over time), temperature coefficient, retrace (the ability of the electrical parameters of a capacitor to resume their initial values after environmental testing) and insulation resistance (the ratio of direct current voltage applied between terminals of a capacitor to the resulting leakage current, after the initial charging current has ceased).

SUMMARY OF THE INVENTION

It is a primary object of the present invention to provide a method for forming capacitors in which thermal shock is eliminated. It is a further object of the invention to provide a method of heating wound capacitors so that heating of the winding occurs either uniformly or from the innermost turns to the outermost turns. It is yet another object of the present invention to provide a method of manufacturing capacitors which eliminates rippling and problems caused thereby. It is yet another object to provide a method for heat treating wound capacitors so that a complete rather than partial heat shrink of the dielectric film can be achieved. It is yet another object of the present invention to provide a method of heat treating wound capacitors in which the heat treating time is significantly reduced in comparison to prior art methods.

The foregoing and other objects are achieved by utilizing a method for heat treating capacitors in which the wound cylinders are subjected to radiant energy such as infrared. The wavelength of the radiant energy is such that most of it is transmitted by the dielectric film. The degree of transmittance is high enough so that the inner turns of the cylinder will reach heat shrink temperature before the outer turns, thus causing the dielectric film to shrink progressively from the inner turns to the outer turns. Heating in this manner prevents thermal shock and its associated problems. Since there is no thermal shock induced radial pressure to be relieved, the heat shrink time for the cylinder can be greatly reduced.

By optimizing the heat shrink operation in the manner described, the drift, insulation resistance, retrace, capacitance distribution and temperature coefficient properties of the capacitors are greatly improved. In addition, since there is no compromise between conflicting forces, capacitors may be "fine turned" by subjecting them to additional brief heat shrink cycles after the initial heat shrink operation. This fine tuning capability enables a significant increase in capacitor yield to be achieved.

BRIEF DESCRIPTION OF THE DRAWINGS

The invention will be described in detail with reference to the drawings in which:

FIG. 1 is a perspective view of a cylindrical winding used to make a foil-film capacitor including a description of the way in which heating occurs with prior art methods.

FIG. 2 is a perspective view of a cylindrical winding used to make a metalized film capacitor;

DESCRIPTION OF THE PREFERRED EMBODIMENT

Figure 3:
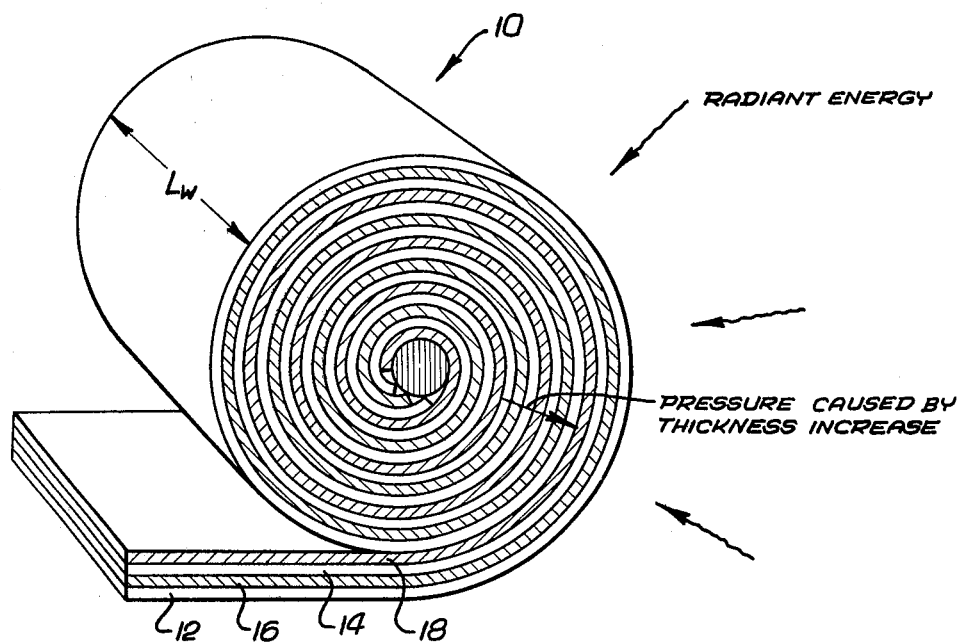
FIG. 3 is a perspective view of a cylindrical winding which is heat shrunk using the method of the present invention.

Referring to the drawings, FIG. 1 shows a typical film-foil PFC cylinder 10 (shown in a partially unwound state for purposes of clarity). Alternating layers of two oriented (i.e., stretched along their length L and/or width W) dielectric films 12 and 14, and two metallic foil electrode plates 16 and 18 are wound around a mandrel 20 to form the cylinder 10, with the dielectric layer 12 forming the outer surface of the cylinder. FIG. 2 shows a typical metallized film PFC cylinder 22. The cylinder 22 is identical to the cylinder 10 with the exception that the foil electrodes 16 and 18 of the cylinder 10 are replaced with metallization layers 24 and 26 which are vapor deposited on dielectric plastic film layers 28 and 30, respectively. The use of the metallization layers results in a much more compact winding as compared to the use of foil. The manufacturing process is substantially the same for film-foil and metallized film capacitors and the manufacturing process will therefore be discussed only with reference to the film-foil type.

In order to obtain an electrically and mechanically stable PFC, intimate physical bonding between adjacent turns of the cylinder 10 is necessary. Otherwise, air is trapped between adjacent turns so that slight fluctuations in environmental variables (i.e., barometric pressure, humidity and temperature) may have a significant effect on the PFC's performance parameters such as life stability (drift), temperature coefficient, retrace properties and insulation resistance. This is accomplished by applying heat to the cylinder sufficient to raise the temperature of the oriented dielectric windings 12 and 14 to heat shrink temperature. Once at this temperature the dielectric windings begin to shrink down to their unoriented dimensions causing them to spirally pull down upon themselves and thicken, thereby squeezing trapped air out from between adjacent turns.

A major problem attending the prior art process of heating the cylinder by conventional convection methods is that the dielectric winding is heated at an uneven or non-uniform rate. As shown in FIG. 1, thermal energy comes in contact first with the outermost dielectric turn 12a and most of this energy is absorbed by that turn. Most of what little energy that is transmitted inward through the outermost turn is absorbed by the next turn 14a. Because of the dielectric film's poor thermal conductivity, the outer turns will heat up at a significantly faster rate than the interior turns and will reach heat shrink temperature well before the interior turns. The outer turns will thus attempt to shrink down to their pre-oriented dimensions while the interior turns remain locked in their stretched state. This initial heating of the outer turns is referred to as thermal shock. The dimensional changes of the outer turns cause inward radial pressure (as shown by arrow 30 in FIG. 1) to build up in the cylinder 10 as the outer turns shrink down. The radial pressure built up in the cylinder 10 may have a substantial detrimental effect on various PFC performance parameters. Extended heat shrink time is necessary to allow for the conductance of sufficient thermal energy to the interior turns to cause them to reach shrink temperature and shrink down, thus reducing the radial pressure and negating its adverse effects. The thermoplastic dielectric is such a poor thermal conductor that before the interior turns reach shrink temperature the radial pressure is so great that minute ripples or wrinkles 32 may develop in some of the interior turns of the cylinder, thereby trapping air in the pockets created between adjacent turns. The trapped air reduces the stability of the PFC which is produced.

Heat is eventually conducted to the innermost turns 12b and 14b of the cylinder, causing those turns to begin to shrink. This shrinking occurs after the outermost turns have begun to shrink but before the shrinking of the remaining interior turns. Eventually the remaining turns will also begin to revert to their original dimensions. The shrinking of the inner turns causes them to pull down in a spiral direction, as indicated by arrow 34. Because of the inward radial pressure created by the thermal shock, the spiral pulling causes friction to be created between adjacent turns of the film and foil. If heat is applied for too long a time the frictional force can cause degradation of the dielectric film beyond acceptable limits. Because of this limitation, the heat shrink process must be halted before the radial pressure caused by the thermal shock is completely relieved.

Figure 4:
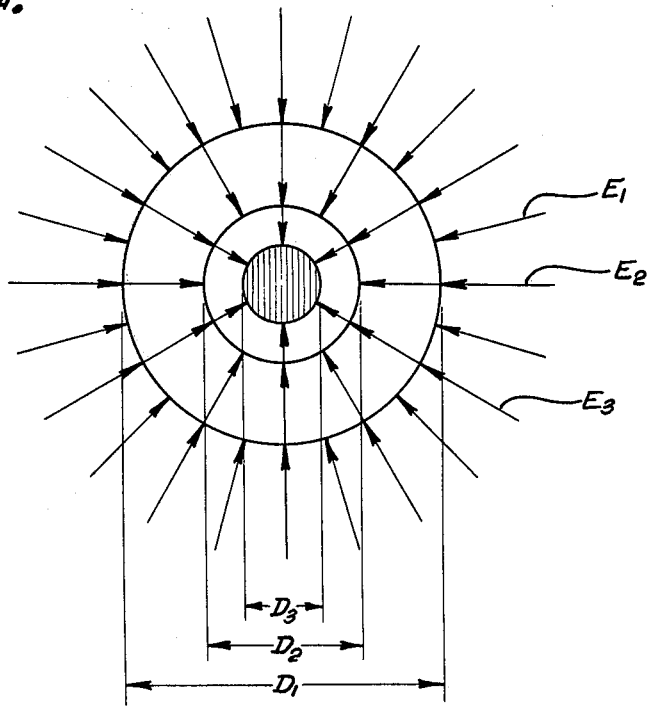
FIG. 4 is a plan view of circular cross-sections of a cylinder showing how energy is transmitted to the inner windings of the cylinder.

Referring now to FIGS. 3 and 4, the present invention provides a process for heating the PFC cylinder which eliminates thermal shock and the consequent radial pressure, friction and spiral strain problems which exist with conventional convection heating methods. This is accomplished by heating the PFC cylinder either uniformly or from the inside to the outside rather than from the outside in. In this way there is no thermal shock and its consequent radial pressure build-up because the interior turns heat up and begin to shrink down at the same time or before the outer turns. The increasing thickness of the interior turns caused by their shrinking will result in pressure being exerted in an outward rather than inward direction (after the initial slight collapse of the mandrel). Since there is no inward pressure, there is little or no friction to degrade the dielectric film as it pulls down spirally. With no inward radial pressure to relieve, extended heating is not necessary to cause sufficient shrinking to produce a rigid cylinder.

Uniform (or interior to exterior) heating may be achieved by using radiant energy to heat the cylinder 10 rather than conventional convection heat. For most dielectrics, infrared energy having a wavelength of between approximately 0.8 and 5.0 microns is suitable. In an infrared oven, the total energy that a winding will receive is the result of the total energy being emitted per unit area in the oven times the total surface area being radiated. Therefore, the larger the diameter of the winding the more total energy it will draw from the oven because more area is being radiated. As can be seen in FIG. 4, a cylinder will receive a total amount of energy equal to $E_1$. Some portion of the energy $E_1$ will pass through the windings into the inner turns of the cylinder. This energy is designated $E_2$ and its value depends upon the transmittance of the outer turns of the cylinder. Similarly, a portion of $E_2$ will pass through the windings and into the innermost turns of the cylinder. The energy which reaches these turns is designated $E_3$. The portion of incident energy which passes through each turn (the transmittance) is equal to $\beta/t_f$ where $\beta$ is a transmittance constant for the particular dielectric being used and $t_f$ is a function of the thickness of the dielectric layer. For the dielectrics commonly used to form film capacitors, $\beta/t_f$ is 0.9 or greater, meaning that at least 90% of the incident energy passes through each turn and less than 10% is absorbed by the turn. The total energy received by the nth turn is:

$$E_n = E_1 (\beta/t_f)^{n-1} \quad n=1, 2, 3 \ldots \tag{1}$$

In order for a heating to occur from the inside out, it is not the total energy received but rather the energy per unit area which is received which must be greater for the inner turns than the outer turns. That is, the ratio of $E_1$ to the area it radiates must be less than the ratio of $E_2$ to the areas they radiate. The amount of energy received per unit area at the nth turn is as follows:

$$\text{Energy per unit area} = \frac{E_1 (\beta/t_f)^{n-1}}{\pi D_n L_w} \tag{2}$$

where $D_n$ is the diameter of the nth turn and $L_w$ is the length of the winding (FIG. 3).

In order for the energy per unit area to be progressively greater from the outer turns to the inner turns, $$\frac{E_n}{\pi D_n L_w} \leq \frac{E_{n+1}}{\pi D_{n+1} L_w} \tag{3}$$

This can be rewritten as:

$$\frac{E_n}{D_n} \leq \frac{E_{n+1}}{D_{n+1}} \text{ or } \frac{E_n}{E_{n+1}} \leq \frac{D_n}{D_{n+1}} \tag{4}$$

From equation (1) it can be determined that $$\frac{E_n}{E_{n+1}} = \frac{E_1 (\beta/t_f)^n}{E_1 (\beta/t_f)^{n-1}} = \frac{1}{\beta/t_f} = \frac{t_f}{\beta} \tag{5}$$

Therefore, in order to achieve proper heating, $$\beta/t_f \geq \frac{D_{n+1}}{D_n} \tag{6}$$

Since $\beta/t_f$ for most common dielectrics is over 0.9, it is not at all difficult to comply with the requirements of equation 6. Although there are some losses associated with the electrode plate layers of each turn due to refraction and absorption, the losses are not so much as to prevent the attainment of the desired heating effect.

Even if the energy passing through the turns is such that the energy per unit area is equal for each turn, or even slightly greater for the outer turns than the inner turns, heating of the winding will still be accomplished from the inside out. This is because conduction and convection cooling is also taking place at the same time that the radiant energy is heating the cylinder, thus drawing heat away from the cylinder. Due to the poor conduction of the dielectric, most of this heat will be drawn away from the outer windings and the inner turns will therefore reach heat shrink temperature first since they are not losing their heat as fast as are the outer turns.

Thus, by utilizing radiant infrared energy the heat shrink operation can be accomplished in a way that the inner turns will shrink at least as fast as the outer turns. Because of this, there will be no thermal shock to cause a build up of radial pressure. With no radial pressure to relieve there will also be very little spiral strain developed in the film as it shrinks. Because there is minimal radial pressure built up during the shrink, the heat shrink time does not have to be increased to relieve the pressure. Total heat shrink occurs in a matter of minutes rather than hours as is the case when convection heating is used.

In order to mass produce capacitors according to the present invention, a conveyor belt-type infrared oven with variable speed drive and infrared heating elements capable of delivering a wavelength of 1.2 microns is preferred. The 1.2 micron wavelength is preferred because the radiant element sources for this wavelength are economical and readily obtainable. In addition, there are many economical building materials available which are almost totally transparent to infrared radiation of that wavelength. Therefore, when used as holding containers for the wound cylinders, these materials will not interfere with the heat shrink operation. It is also possible to use various wavelengths so as to take advantage of the slight differences in transmittance of the different dielectrics, but this tends to complicate the process somewhat.

Although the infrared process eliminates problems associated with thermal shock, the process still has no control over the dielectric film's original oriented stress, coefficient of friction or thickness variations. These parameters are still under the control of raw dielectric film manufacturers. Because of the existence of these variables, there is no such thing as an absolute across the board time and temperature for the heat shrink process. For a particular type of capacitor (i.e., capacitance value, size and material) the manufacturer, through experimentation, identifies nominal time and temperature heat shrink parameters that are needed to produce a high quality capacitor. Due to variations in the dielectric film, however, the nominal values may not produce capacitors which fall within the prescribed capacitance tolerance band. Because there is no thermal shock to contend with in the infrared process, the manufacturer can adjust the time and temperature of the shrink to vary the final capacitance value without degrading the capacitor's properties. This ability increases capacitor yield and therefore decreases the manufacturing costs. In order to maximize yield, the heat shrink operation can be controlled so that all of the windings will receive either proper shrink or not enough shrink despite any parameter variations. Once out of the oven, the units are sorted and those capacitors which did not receive enough shrink are subjected to a second infrared heat treating cycle. This process is repeated until all of the capacitors which were initially undershrunk have received the proper shrink. By employing this multi-step process, the capacitor yield can be further increased. Since the infrared method gives so much better control and can be done in such a short period of time relative to convection heating, it can be used to "fine tune" capacitors in order to produce the best quality, highest yielding parts possible. This fine tuning could even be accomplished after the manufacturing is completed, i.e., units could be pulled from stock and shifted in capacitance value so as to fall within a tighter tolerance band. Even units which have been processed by the standard convection oven method or on a heated platen (such as with flattened units) can be subjected to the infrared method to reduce stress and "fine tune" the units.

The present invention thus provides a method of uniformly heat shrinking capacitor windings, thereby resulting in fewer wrinkles and less physical stress. More air is removed from the capacitor winding than with previous methods, thereby resulting in a tighter capacitance value distribution. The increased removal of air also results in a tighter temperature coefficient distribution. A total shrink rather than compromise shrink is facilitated due to the elimination of thermal shock. Since radial stress is not built up during the shrink, the shrink time does not have to be extended to relieve any excess stress, thus resulting in greatly reduced heat shrink time and energy usage.

I claim:

1. A process for manufacturing plastic film capacitors comprising the steps of:
    spirally winding alternating layers of oriented thermoplastic dielectric film and metallic foil electrodes to thereby form a cylinder having a plurality of turns; and
    applying energy to the wound cylinder to cause the dielectric film to shrink toward its unoriented state, thereby forming a rigid cylinder, wherein the energy applied to the dielectric per unit area is at least as great at the inner turns of the cylinder as it is at the outer turns.

2. A process for manufacturing plastic film capacitors comprising the steps of sprirally winding alternating layers of oriented thermoplastic dielectric film and metallic foil electrodes to form a cylinder having a plurality of turns and applying radiant energy to the cylinder to cause the dielectric film to shrink toward its unoriented state, thereby forming a rigid cylinder, wherein the transmittance of the dielectric film is such that the film will shrink progressively from the inner turns to the outer turns.

3. A process for manufacturing plastic film capacitors comprising the steps of:
    spirally winding at least two layers of oriented metallized dielectric thermoplastic film to thereby form a cylinder having a plurality of turns; and
    applying energy to the cylinder to cause the film to revert toward its unoriented state thus forming a rigid cylinder, wherein the energy is applied so that the film will shrink progressively from the inner turns to the outer turns.

4. The process of claims 1, 2 or 3 wherein the applied energy is radiant energy having a wavelength between approximately 0.8 microns and approximately 5.0 microns.

5. The process of claim 4 wherein the radiant energy has a wavelength of approximately 1.2 microns.

6. In a process for manufacturing plastic film capacitors in which alternating layers of oriented thermoplastic dielectric film and metallic foil electrodes are spirally wound to form a cylinder and the resulting cylinder is heated to cause shrinkage of the dielectric film to thereby form a stable cylinder, the improvement comprising heating the dielectric windings so that the heating occurs at a progressively slower rate from the inner dielectric turns to the outer dielectric turns.

7. The process of claim 6 wherein the step of heating comprises subjecting the cylinder to radiant energy.

8. The process of claim 7 wherein the radiant energy has a wavelength between approximately 0.8 microns and approximately 5.0 microns.

9. A process for manufacturing plastic film capacitors comprising the steps of:
(a) winding alternating layers of thermoplastic dielectric film and metal to form a cylinder, each cylinder having a plurality of turns of dielectric film and metal, respectively;
(b) applying radiant energy of a predetermined wavelength to the cylinder thereby causing shrinkage of the dielectric film, wherein the metal and dielectric windings transmit a portion of said applied radiant energy sufficient to cause the inner dielectric turns to receive an amount of energy per unit area which will cause shrinkage of the dielectric film to occur progressively from the inner turns to the outer turns.

10. The process of claim 9 wherein the metal layer comprises metallic foil.

11. The process of claim 9 wherein the metal layer comprises a layer of metallization located on each layer of dielectric film.

12. The process of claim 9 wherein the amount of energy applied per unit area of dielectric film is greater at the inner turns than at the outer turns.

* * * * *

UNITED STATES PATENT AND TRADEMARK OFFICE
CERTIFICATE OF CORRECTION

PATENT NO. : 4,363,162
DATED : December 14, 1982
INVENTOR(S) : Rick A. Price

It is certified that error appears in the above–identified patent and that said Letters Patent are hereby corrected as shown below:

On the title page insert;

-- [73] Assignee: TRW INC., Los Angeles, California --

Signed and Sealed this

Fourteenth Day of June 1983

[SEAL]

Attest:

DONALD J. QUIGG

Attesting Officer     Acting Commissioner of Patents and Trademarks